3,471,376
Patented Oct. 7, 1969

3,471,376
METAL BONDABLE POLYCARBONATE PLASTICS
Edward B. Saubestre and Lawrence J. Durney, Hamden, Conn., assignors to Enthone Incorporated, New Haven, Conn.
No Drawing. Filed Mar. 2, 1965, Ser. No. 436,663
Int. Cl. C23b 5/62; C23f 17/00
U.S. Cl. 204—30
8 Claims

ABSTRACT OF THE DISCLOSURE

This invention is concerned with a metal-plated polycarbonate plastic object or article, and a process for metal plating a polycarbonate surface involving the contacting of the polycarbonate plastic surface to be metal coated with a strongly alkaline aqueous oxidizing solution containing an oxidizing agent until a gel structure appears on the plastic surface, followed by chemically etching the gelled plastic surface, and subsequently metal plating the plastic surface.

---

This invention relates to metal bondable polycarbonate plastics and to a process for the preparation of such plastics for the application of metal coatings, both decorative and non-decorative, to the surfaces of such plastics.

Polycarbonate plastics are especially characterized by (1) high impact strength, (2) transparency, (3) self-extinguishing, (4) dimensional stability, (5) wide color range, (6) high strength at low temperatures, (7) non-toxicity and (8) versatility of fabrication. These physiochemical characteristics of modern polycarbonate resins render them particularly amenable for useful application in packaging, graphic arts, electrical insulation, thermoforming and other applications to which the resins described in the Emons and Saubestre application are not as well qualified.

Commercially available polycarbonate plastics may be graphically represented by the formula $$H\left[O-R-O-\overset{\overset{O}{\|}}{C}\right]_x O-R-OH$$

wherein X is frequently rather indeterminate, and its identification is somewhat a matter of conjecture among those skilled in the art. Consensus, however, of scientists is that X is about 100 to 400 for most commercial plastics. R may be aliphatic, aromatic, aliphatic-aromatic, or mixtures thereof.

For aliphatics, R is commonly $(-CH_2)_n$ where $n=3-10$;

$$-CH_2-CH_2-O-CH_2-CH_2-,\ -CH_2-\underset{\underset{CH_3}{|}}{\overset{\overset{CH_3}{|}}{C}}-CH_2-,\ -CH_2-\underset{\underset{(CH_2)_{1-3}}{|}}{\overset{\overset{CH_3}{|}}{C}}-CH_2-$$
$$\hphantom{-CH_2-\overset{\overset{CH_3}{|}}{C}-CH_2-,\ -CH_2-\overset{\overset{CH_3}{|}}{C}-CH_2-,\ \ } \hphantom{ xxxxx} CH_3$$

For aliphatic-aromatics, R is commonly

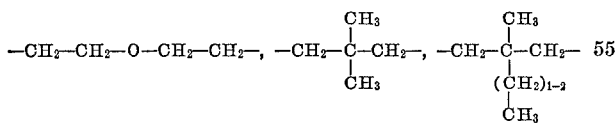

where $n=1-2$ and $m=1-2$,

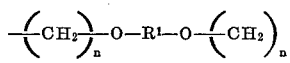

where $n=1-2$, and $R^1=$

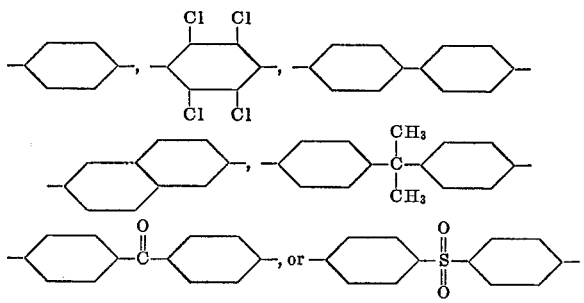

For aromatics, R is commonly

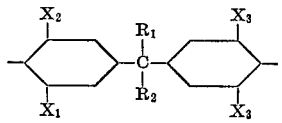

where $$R_1 = -H, -CH_3, -(CH_2)_n-CH_3 \text{ (and } n=1-6\text{)}, -C\underset{CH_3}{\overset{\overset{CH_3}{\diagup}}{\mathrm{H}}}$$

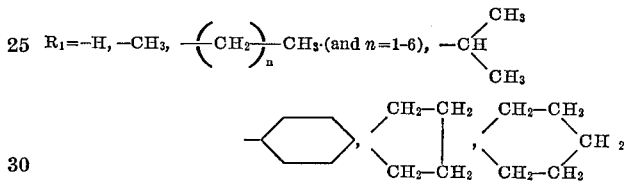

and $R_2$ equals all the above except the last two, $X = -H$, $-Cl$, or $-Br$.

Other examples may be found in the text "Chemistry and Physics of Polycarbonates" by H. Schnell (John Wiley), especially Chapters III, IV and V.

Preferably, commercially available polycarbonate plastics may be graphically represented by the formula

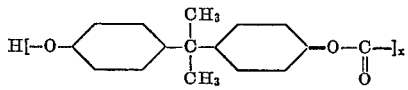

The preparation of these plastics involves the formation of polymers from a reaction of bis-phenol A with phosgene, spliting out hydrochloric acid, in the course of the reaction, to form the structure signified above where x has the approximate value of from 100 to 400. Polycarbonate resins, typically of the type to which the present invention is applicable, are sold under the trademark "Lexan" produced by the General Electric Company.

The product and process of the present invention, although not restrictive thereto, is particularly applicable to the product and process described in the copending application of Emons and Saubestre, Ser. No. 303,670, filed Aug. 21, 1963, now abandoned. The copending U.S. patent application Ser. No. 550,624, filed May 17, 1966 is a continuation-in-part of application Ser. No. 303,670.

As pointed out in the specification forming a part of said application, prior art procedures necessitated an initial mechanical roughening of deglazing manipulation which were essential and required to render the surface of the plastic amenable to the application of an adherent metal plating to the plastics surface both through fairly weak chemical bonds and through a mechanical "keying"

action arising from the surface irregularities. Conventional procedures, before the advent of the Emons and Saubestre procedure described in abandoned, Ser. No. 303,670, involved the steps of (1) roughening (deglazing) and (2) ethching, employing a chemical etch to produce a hydrophilic surface. The most commonly employed and useful etching for plastics is a chrome-sulfuric acid combination, typical examples of which are as follows:

(1) $CrO_3$ _____oz./gallon__ 10
    $H_2SO_4$ _____fl. oz./gallon__ 32
(2) $K_2Cr_2O_7$ _____g__ 15
    $H_2SO_4$ _____ml__ 100
    $H_2O$ _____ml__ 50

The treatment occurs at room temperature for a period of from one to two minutes as required to produce the desired hydrophilic surface and such treatments have been successfully employed on thermoplastic resins such as the acrylics, casein, cellulosics, epoxies, phenolics, polyamides, styrenes and vinyls. In addition to this all around etching procedure, phenolics, cellulosics and urea-formaldehyde resins may be subjected to a solution such as the following:

$H_2SO_4$ _____gallons__ 2
$HNO_3$ _____do____ 1
HCL _____fl. oz__ 1
$H_2O$ _____quart__ 1

After etching, the part is rinsed thoroughly and neutralized with dilute aqueous alkali solution. In addition, urea-formaldehyde resins may be first roughened in a 10% hydrochloric acid solution and then further etched in a 1% ferrous ammonium sulfate for a period of approximately 15 minutes. A further approach to the etching problem is to follow up mechanical treatment with the use of a solvent type etch which will convert the surface of the plastic to the desired hydrophilic condition. In some cases, the plastic substrate will not respond to the above acid and alkaline etchings and, therefore, must be treated in a solvent type etch, for example, in the case of ordinary rubber and fully cured thermosetting plastics.

The next step in prior procedures is the sensitization of the thereby formed hydrophilic surface by the absorption of a readily oxidizable material to enable later deposit of a catalyst film. The conventional sensitization step involves, typically, the use of stannous chloride with an acid supporting medium such as hydrochloric acid, ethanol, ethanol and caustic, or ethanol and a hydroquinone, for example. Various other sensitization procedures may be employed as described in abandoned Ser. No. 303,670.

Following sensitization, in prior art methods, the surface is then activated with a solution containing a noble metal salt whereby the metal is reduced, thereby acting as a catalytic surface for localizing further plating procedures. Virtually all of the noble metals which are readily deposited by stannous chloride are catalytic for the common electroless plating solutions including gold, silver, nickel and copper. The platinum group metals, including palladium, are most commonly employed.

The next step is the conversion of the plastic surface to an electrically conductive one by applying a thin metallic coating from a chemical reduction plating solution. Metals commonly applied in this way include copper, silver and nickel inter alia. After electroless plating is accomplished, the still non-conductive plastic article is usually placed in a copper electroplating bath and about 2 to 5 mils of copper are applied to the surface. The surface, according to prior art procedure, must then be suitably polished or buffed and then plated with bright nickel and finally subjected to a chromium, gold, or other plating procedures to produce a decorative or non-decorative outer surface on the plastic substrate.

By use of the process of the Emons and Saubesrte application abandoned Ser. No. 303,670, which involves the use of a novel etchant containing phosphate ions, mechanical roughening is entirely eliminated, permitting the use of conventional automatic plating equipment.

Also by the procedure of abandoned Ser. No. 303,670, subsequent electrodeposits, if produced from bright plating formulations, will be bright abinitio, thus eliminating polishing or burnishing, on expensive manual or semimanual operations.

The process of abandoned Ser. No. 303,670 involves the following steps:

(1) Cleaning.—In most circumstances, a conventional alkaline cleaner (preferably non-silicated) may be used for preliminary cleaning of the part. In the case of some plastics, it has been found by us that use of a mildly oxidizing alkaline cleaner may be better. While not intended to be restrictive, the following are two specific cleaners of this class which have been used successfully:

|  | G./l. |
| --- | --- |
| (a) NaOH | 180 |
| $NaNO_3$ | 24 |
| $NaNO_2$ | 36 |
| (b) NaOH | 80 |
| $NaNO_3$ | 16 |
| $NaClO_3$ | 24 |

Cleaning is followed by rinsing.

(2) Etching.—The part is then etched as described in the Emons and Saubestre application 303,670, filed Aug. 21, 1963, now abandoned. This special etching procedure may involve the use of a mixture of sulfuric acid, chromic acid, phosphoric acid and water, as essential ingredients. The weight ratio of sulfuric acid to phosphoric acid in the etchant should, preferably, be about 0.5–5.0; the weight ratio of phosphoric acid to chromic acid in the etchant should, preferably, be about 5–25; the weight ratio of sulfuric acid to chromic acid is not critical within the above limitations and the amount of water in the etchant, exclusive of that contained in the acids above defined, should be about 5–80 percent by weight with best results generally obtained at the lower end of the range and the temperatures may range from 60 to 170° F. Etching time may range from 15 seconds to 30 minutes depending upon the degree of susceptibility of the plastic to attack by the etchant. Etching is followed by rinsing.

(3) Sensitizing.—The part is then sensitized as previously described. While not intended to be restrctive, the following has been found to be a useful sensitizer;

$SnCl_2$ _____g__ 10
HCl _____ml__ 40
$H_2O$ _____ml__ 1,000

Rinsing after sensitizing must be very thorough.

(4) Activation.—The part is then activated as previously described. While not intended to be restrictive, the following has been found to be a useful activator:

$PdCl_2$ _____g__ 1
HCl _____ml__ 10
$H_2O$ _____gallon__ 1

Rinsing after activation must be very thorough.

As an alternative to the use of Steps 3 and 4 separately, the method of U.S. Patent 3,011,920 may be used as a single step sensitizer-activator. Rinsing must follow this step, optionally followed by a solubilizing step to dissolve any remaining insoluble tin salts. Perchloric acid or a mixture of oxalic acid and fluoborates may be used for this purpose.

(5) Electroless Plating.—The part is next rendered conductive by depositing copper, nickel or silver by chemical reduction. Suitable formulas are given in the article by E. B. Saubestre, "Electroless Plating Today," Metal Finishing 60, No. 6, 67–73; No. 7, 49–53; No. 8, 45–49; No. 9, 59–63 (1962), but are not intended to be restrictive. Plating is continued until the part to be plated is fully conductive.

(6) Plating.—The part is then plated in a conventional copper plating solution of the acid sulfate, fluoborate, or sulfamate type, or of the alkaline pyrophosphate type. If the part is to have a final bright decorative finish, the plating solution should contain brightners of a conventional sort. Copper plating should be of 0.1–1.5 mils thickness (the use of additional copper thicknesses should be considered as forming a part of this disclosure, but is economically undesirable for ordinary applications).

This copper plating can be followed by any desired final plating, such as nickel-chromium, nickel-gold, etc.

The plastics especially amenable to the Emons and Saubestre process are acrylics, acrylonitrile-butadiene-styrene, acrylonitrile-styrene, casein, cellulosics, epoxies, phenolics, polyacetals, polyamides, styrenes and vinyl resins and modifications of the same.

The etching phase of the process of the Emons and Saubestre application abandoned Ser. 303,670, is a vital phase of the process and although this etching procedure is effective in producing an amenable surface for later mechanical or electro-mechanical plating procedures on plastics, such as acrylics, acrylonitrile-butadiene-styrene, acrylonitrile-styrene, casein, cellulosics, epoxies, phenolics, polyacetals, polyamides, styrenes and vinyl plastics and modifications thereof, it is not effective particularly in the production of an appropriately etched surface area on polycarbonate-type resins. Such resins are resistant to the conventional etchant solutions and we have discovered that polycarbonate resins must be given a treatment with a strongly alkaline aqueous oxidizing solution containing an oxidizing agent for a period sufficient to gel the surface of the polycarbonate plastic to render the same receptive to the later application of adherent metal coatings which are conductive electrolytically and which, therefore, may be placed in conventional electroplating baths for the application of exceptionally adherent metal coatings.

The plating of polycarbonate plastics requires breaking of

bonds found in polycarbonate-type resins in a controlled manner so as to achieve highly adherent metallic coatings in subsequent stages which correspond to the teachings of the copending Emons and Saubestre application abandoned Ser. No. 303,670.

In general, the invention which is the subject of the present application involves subjecting the polycarbonate plastic, prior to etching in the solution of the Emons and Saubestre application referred to heretofore, to contact with a strongly alkaline oxidizing solution for a sufficient period of time until a gel structure appears on the surface. This generally follows the cleaning procedure described in paragraph (1) above. Immersion times may be rather long but can be considerably shortened by the initial dipping of the polycarbonate plastic to be plated in a solvent. The oxidizing alkaline solution employed in the process of the present invention contains one-half to five pounds per gallon of sodium or potassium hydroxide and one-quarter to three pounds per gallon of an oxidizing agent. Suitable oxidizing agents are nitrates, nitrites, chlorites and mixtures thereof.

Pretreatment solvents, which may be optionally employed, include (a) compounds of the class

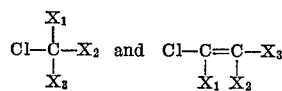

wherein $X_1$, $X_2$ and $X_3$ are selected from the class consisting of chlorine and hydrogen. Compounds of this class include (a) compounds of the indicated formulae and compounds of the formula (b)

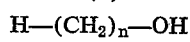

where $n$ is an integer from 1–4 and (c) mixtures of compounds of formula (a) and compounds of formula (b), followed by treatment with a strongly alkaline oxidizing solution to produce said gel structure. Solvents of classes (a) and (b) may be mixed with other materials and need not be present alone. For example, these solvents are frequently combined with various organic acids which seems to speed up the gelling action of the solvents.

The following examples, without being intended to be restrictive, illustrate preferred embodiments of the disclosed invention.

EXAMPLE 1

(1) Gelling treatment in oxidizing alkali. ¾ pounds per gallon sodium hydroxide, ¾ pounds per gallon sodium chlorite, at 200° F. for 10 minutes and cold water rinse.

(2) Etchant, room temperature, for 10 minutes, then cold water rinse.

(3) Dilute acid neutralizing dip, room temperature, 10–20 seconds, then cold water rinse.

(4) Sensitizer, room temperature, 1 minute, cold water rinse.

(5) Activator, room temperature, 1 minute, cold water rinse.

(6) Electroless copper, room temperature, 30 minutes, cold water rinse.

(7) Acid copper plate, room temperature, 1 mil, cold water rinse.

(8) Final plate as desired.

EXAMPLE 2

(1) Gelling solvent treatment in methylene chloride, room temperature, 10 seconds, cold water rinse.

(2) Gelling treatment in oxidizing alkali. 5 pounds per gallon sodium hydroxide, 1 pound per gallon sodium nitrate, 1 pound per gallon sodium nitrite, 200° F., 2 minutes, cold water rinse.

(3) Dilute acid neutralizing dip, room temperature, 10–20 seconds, cold water rinse.

(4) Sensitizer, room temperature, 1 minute, cold water rinse.

(5) Activator, room temperature, 1 minute, cold water rinse.

(6) Electroless copper, room temperature, 30 minutes, cold water rinse.

(7) Acid copper plate, room temperature, 1 mil, cold water rinse.

(8) Final plate as desired.

Referring to the cycle of Example 2, other solvent mixtures could include the following (used under the same conditions as the solvent of Example 2):

| | Lb./gal. |
|---|---|
| (1) Methylene chloride | 9 |
| Phenol | 1⅓ |
| Formic acid | ⅗ |
| (2) Methylene chloride | 7¾ |
| Ethanol | 1⅔ |
| Methanol | ⅓ |
| (3) Methylene chloride | 7¾ |
| Ethanol | 1⅔ |
| Glycolic acid | ½ |
| (4) Methylene chloride | 1 |
| Phenol | ⅖ |
| Dodecylbenzene sulfonic acid | ⅓ |
| Formic acid | ⅕ |
| Cresylic acid | ⅕ |
| Water | Balance |
| (5) Methylene chloride | 1 |
| Ethyl "Cellosolve" (T.M.) | ½ |
| Dodecylbenzene sulfonic acid | ¼ |
| Glycolic acid | ⅕ |
| Water | Balance |

It will be noted that Formulas (1) to (3) above are for largely organic solvents (the organic acids as sold on the market have some water content), while Formulas (4) and (5) are for aqueous solvent systems.

EXAMPLE 3

(1) Gelling treatment in oxidizing alkali. 5 pounds per gallon sodium hydroxide, 1 pound per gallon sodium nitrate, 1 pound per gallon sodium nitrite, 200° F., 10 minutes, cold water rinse.

(2) Etchant, room temperature, for 10 minutes, then cold water rinse.

(3) Dilute acid neutralizing dip, room temperature, 10–20 seconds, then cold water rinse.

(4) Sensitizer, room temperature, 1 minute, cold water rinse.

(5) Activator, room temperature, 1 minute, cold water rinse.

(6) Electroless copper, room temperature, 30 minutes, cold water rinse.

(7) Acid copper plate, room temperature, 1 mil, cold water rinse.

(8) Final plate as desired.

EXAMPLE 4

(1) Gelling solvent treatment in methylene chloride, room temperature, 10 seconds, cold water rinse.

(2) Gelling treatment in oxidizing alkali. ¾ pounds per gallon sodium hydroxide, ¾ pounds per gallon sodium chlorite, 200° F., 2 minutes, cold water rinse.

(3) Dilute acid neutralizing dip, room temperature, 10–20 seconds, cold water rinse.

(4) Sensitizer, room temperature, 1 minute, cold water rinse.

(5) Activator, room temperature, 1 minute, cold water rinse.

(6) Electroless copper, room temperature, 30 minutes, cold water rinse.

(7) Acid copper plate, room temperature, 1 mil, cold water rinse.

(8) Final plate as desired.

EXAMPLE 5

(1) Gelling solvent treatment in methylene chloride, room temperature, 10 seconds, cold water rinse.

(2) Gelling treatment in oxidizing alkali. 5 pounds per gallon sodium hydroxide, 1¾ pounds per gallon sodium nitrate, 1 pound per gallon sodium nitrite, 200° F., 2 minutes, cold water rinse.

(3) Dilute acid neutralizing dip, room temperature, 10–20 seconds, cold water rinse.

(4) Sensitizer, room temperature, 1 minute, cold water rinse.

(5) Activator, room temperature, 1 minute, cold water rinse.

(6) Electroless copper, room temperature, 30 minutes, cold water rinse.

(7) Acid copper plate, room temperature, 1 mil. cold water rinse.

(8) Final plate as desired.

EXAMPLE 6

(1) Gelling solvent treatment in methylene chloride, room temperautre, 10 seconds, cold water rinse.

(2) Gelling treatment in oxidizing alkali. 4¼ pounds per gallon sodium hydroxide, 1¾ pounds per gallon sodium nitrate, 1¾ pounds per gallon sodium nitrite, 200° F., 2 minutes, cold water rinse.

(3) Dilute acid neutralizing dip, room temperature, 10–20 seconds, cold water rinse.

(4) Sensitizer, room temperautre, 1 minute, cold water rinse.

(5) Activator, room temperature, 1 minute, cold water rinse.

(6) Electroless copper, room temperature, 30 minutes, cold water rinse.

(7) Acid copper plate, room temperature, 1 mil, cold water rinse.

(8) Final plate as desired.

Although the above specific examples are given purely for purposes of illustration, it will be understood that such procedures may be altered or varied and modified without departing from the spirit and scope of the invention as defined by the appended claims.

What we claim is:

1. A process for the metal plating of a polycarbonate plastic surface which comprises (1) contacting the surface of the polycarbonate plastic with a strongly alkaline aqueous oxidizing solution containing an alkali metal hydroxide and an oxidizing agent selected from the group consisting of nitrates, nitrites, chlorites, and mixtures thereof for a period sufficient to produce a gel structure on the plastic surface, (2) etching the thus-obtained gelled plastic surface, (3) activating the etched plastic surface, and (4) electrolessly plating a metal coating on the activated surface by contacting said surface with a chemical reduction metal plating solution until the surface is rendered electrically conductive.

2. A process for the metal plating of a polycarbonate plastic surface, which comprises (1) contacting the surface of the polycarbonate plastic with a strongly alkaline aqueous oxidizing solution containing from ½ to 5 pounds per gallon of an alkali metal hydroxide selected from the group consisting of sodium hydroxide and potassium hydroxide and from ¼ to 3 pounds per gallon of an oxidizing agent selected from the group consisting of nitrates, nitrites, chlorites, and mixtures thereof for a period sufficient to produce a gel structure on the plastic surface, (2) etching the thus-obtained gelled plastic surface, (3) activating the etched plastic surface, and (4) electrolessly plating a thin metal coating on the activated surface by contacting said surface with a chemical reduction metal plating solution until the surface is rendered electrically conductive.

3. The process of claim 2 further characterized by, prior to contacting the polycarbonate plastic surface with the alkaline aqueous oxidizing solution containing the oxidizing agent, contacting the plastic surface with a solvent therefor.

4. The process of claim 3 wherein the solvent comprises a material selected from the group consisting of
(a) compounds of the formulae:

and

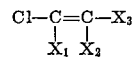

wherein $X_1$, $X_2$ and $X_3$ are each chlorine or hydrogen;

(b) compounds of the formula:

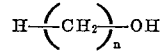

wherein $n$ is an integer from 1–4; and
(c) mixtures of (a) and (b).

5. The process of claim 2 wherein the etching of the gelled plastic surface is effected with a strongly acid etchant solution containing phosphate ions.

6. The process of claim 2 further characterized by sensitizing the etched plastic surface prior to the activating.

7. The process of claim 2 further characterized by electroplating a thin copper layer on the electrolessly metal plated surface.

8. The process of claim 2 wherein the polycarbonate plastic surface is cleaned prior to being contacted with the alkaline aqueous oxidizing solution.

References Cited
UNITED STATES PATENTS

| | | | |
|---|---|---|---|
| 3,252,844 | 5/1966 | Hechelhammer et al. | 156—2 |
| 3,356,522 | 12/1967 | Libbert | 117—138.8 XR |
| 3,361,589 | 1/1968 | Lindsey | 156—2 XR |
| 2,955,954 | 10/1960 | Collins | 117—47 |
| 3,069,287 | 12/1962 | Hudson | 117—47 |
| 3,142,582 | 7/1964 | Koretzky et al. | 117—47 |
| 3,167,491 | 1/1965 | Harrison et al. | 204—30 |
| 3,245,826 | 4/1966 | Luce et al. | 117—47 |
| 3,248,271 | 4/1966 | Rielly et al. | 156—2 |

HOWARD S. WILLIAMS, Primary Examiner

W. VAN SISE, Assistant Examiner

U.S. Cl. X.R.

117—47; 156—2; 204—20, 38